United States Patent
Frederick et al.

(10) Patent No.: US 10,618,468 B2
(45) Date of Patent: Apr. 14, 2020

(54) LATERAL VIEW SYSTEM FOR VEHICLE

(71) Applicant: TOYOTA MOTOR ENGINEERING & MANUFACTURING NORTH AMERICA, INC., Plano, TX (US)

(72) Inventors: Scott L. Frederick, Brighton, MI (US); Scott P. Robison, Dexter, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/049,101

(22) Filed: Jul. 30, 2018

(65) Prior Publication Data

US 2020/0031280 A1    Jan. 30, 2020

(51) Int. Cl.
  *B60R 1/00* (2006.01)
  *B60R 11/04* (2006.01)
  *H04N 7/18* (2006.01)
  *H04N 5/232* (2006.01)
  *B60R 11/00* (2006.01)

(52) U.S. Cl.
  CPC .......... *B60R 1/00* (2013.01); *B60R 11/04* (2013.01); *H04N 5/23203* (2013.01); *H04N 7/183* (2013.01); *B60R 2011/004* (2013.01); *B60R 2011/0045* (2013.01); *B60R 2011/0085* (2013.01); *B60R 2011/0092* (2013.01); *B60R 2300/8046* (2013.01)

(58) Field of Classification Search
  CPC ..... B60R 1/00; B60R 11/04; B60R 2011/004; B60R 2011/0045; B60R 2011/0085; B60R 2011/0092; B60R 2300/8046; H04N 5/23203; H04N 7/183

USPC ........................................................ 348/148
See application file for complete search history.

(56) References Cited

U.S. PATENT DOCUMENTS

| 7,446,650 | B2 * | 11/2008 | Scholfield | B60R 1/06 340/438 |
|---|---|---|---|---|
| 9,321,410 | B2 | 4/2016 | Hansen | |
| 9,403,491 | B2 | 8/2016 | Happy et al. | |
| 9,409,529 | B2 | 8/2016 | Dziurda et al. | |
| 9,623,811 | B2 | 4/2017 | Alexander et al. | |
| 2002/0113875 | A1 | 8/2002 | Mazilli | |

(Continued)

FOREIGN PATENT DOCUMENTS

| CN | 203358457 U | 12/2013 |
|---|---|---|
| DE | 10 2015 117 612 A1 | 4/2017 |

*Primary Examiner* — Thai Q Tran
*Assistant Examiner* — Nienru Yang
(74) *Attorney, Agent, or Firm* — Oblon, McClelland, Maier & Neustadt, L.L.P.

(57) ABSTRACT

A lateral view system for a vehicle including a display device that displays a lateral view of the vehicle, a camera operatively coupled to the display device that captures the lateral view of the vehicle, and an arm assembly that articulates the camera between a concealed position to be concealed in a door portion of the vehicle and an extended position to capture the lateral view of the vehicle, the arm assembly including an arm member having a camera, an arm housing embedded in the door portion of the vehicle to receive the arm member, and an arm external surface that matches an external surface of the door portion and seats substantially flush with the external surface of the door portion when the camera is in the concealed position.

20 Claims, 8 Drawing Sheets

(56) References Cited

U.S. PATENT DOCUMENTS

| | | | |
|---|---|---|---|
| 2008/0275618 A1* | 11/2008 | Grimm | G08G 1/162 |
| | | | 701/96 |
| 2009/0309971 A1* | 12/2009 | Schuetz | B60R 11/04 |
| | | | 348/148 |
| 2014/0192196 A1* | 7/2014 | Englander | B60Q 1/24 |
| | | | 348/148 |
| 2015/0097953 A1 | 4/2015 | Stambaugh | |
| 2015/0183380 A1* | 7/2015 | Da Deppo | H04N 7/183 |
| | | | 348/148 |
| 2016/0214536 A1* | 7/2016 | Burdge | B60R 1/007 |
| 2017/0080878 A1 | 3/2017 | Gonzalez et al. | |
| 2017/0282806 A1 | 10/2017 | Peterson et al. | |
| 2017/0374289 A1* | 12/2017 | Wierich | H04N 5/247 |

* cited by examiner

LATERAL VIEW SYSTEM FOR VEHICLE

BACKGROUND

Field of the Disclosure

The present disclosure relates to camera for vehicle that supplements driver field of view.

Description of the Related Art

In today's automotive industry, producing vehicles that maximize the visibility of the drivers is essential.

Such a demand in visibility can be address by extending the lateral field of view of the drivers.

To this end, conventional optical systems, e.g. mirrors and/or cameras, positioned outside the vehicle to capture blind spots and/or hardly accessible field of views, e.g. rear and/or lateral field of views, have been implemented.

Although such conventional optical systems are widely used in vehicles, they present important drawbacks. Notably, these conventional optical systems protrude substantially from the vehicles and may be hit and/or bumped by other vehicles and/or pedestrians. In addition, these conventional optical systems provide a bulky, non-uniform, and a non-discrete appearance for the vehicles.

Thus, a lateral view system solving the aforementioned problems of protrusion and concealment is needed.

SUMMARY

Accordingly, the object of the present disclosure is to provide a lateral view system to provide lateral and/or peripheral vision when in use and concealment when not in use.

According to an embodiment, the present disclosure is related to A lateral view system for a vehicle, comprising a display device that displays a lateral view of the vehicle, a camera operatively coupled to the display device that captures the lateral view of the vehicle, and an arm assembly that articulates the camera between a concealed position in a door portion of the vehicle and an extended position to capture the lateral view of the vehicle, the arm assembly including an arm member having a first terminal portion articulably affixed to the door portion, and a second terminal portion affixed to the camera, an arm housing embedded in the door portion of the vehicle to receive the arm member, and an arm external surface that matches an external surface of the door portion and seats substantially flush with the external surface of the door portion when the camera is in the concealed position.

According to an embodiment, the present disclosure further relates to a lateral view system for a vehicle, comprising a display device that displays a lateral view of the vehicle, a camera operatively coupled to the display device that captures the lateral view of the vehicle, an arm assembly that articulates the camera between a concealed position in a door portion of the vehicle and an extended position to capture the lateral view of the vehicle, the arm assembly including an arm member having a first terminal portion articulably affixed to the door portion, and a second terminal portion affixed to the camera, and arm actuators that connect the first terminal portion to the door portion, an arm housing embedded in the door portion of the vehicle to receive the arm member, and an arm external surface that matches an external surface of the door portion and seats substantially flush with the external surface of the door portion when the camera is in the concealed position, a plurality of sensors to provide driving signals commensurate with driving conditions of the vehicle, and an electrical control unit configured to receive the driving signals, detect a need of the lateral view based on the driving signals, and send actuation signals to the arm actuators to articulate the camera from the concealed position.

According to an embodiment, the present disclosure further relates to a method for providing lateral view of a vehicle to a driver, comprising acquiring driving signals commensurate with a driving conditions of the vehicle from a plurality of driving sensors, detecting a need for a lateral view of the vehicle, actuating an arm from a concealed position to a deployed position, acquiring image signals commensurate with the lateral view of the vehicle from a camera positioned on the arm, and displaying the lateral view of the vehicle on a display device positioned on an internal surface of the vehicle.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1A:
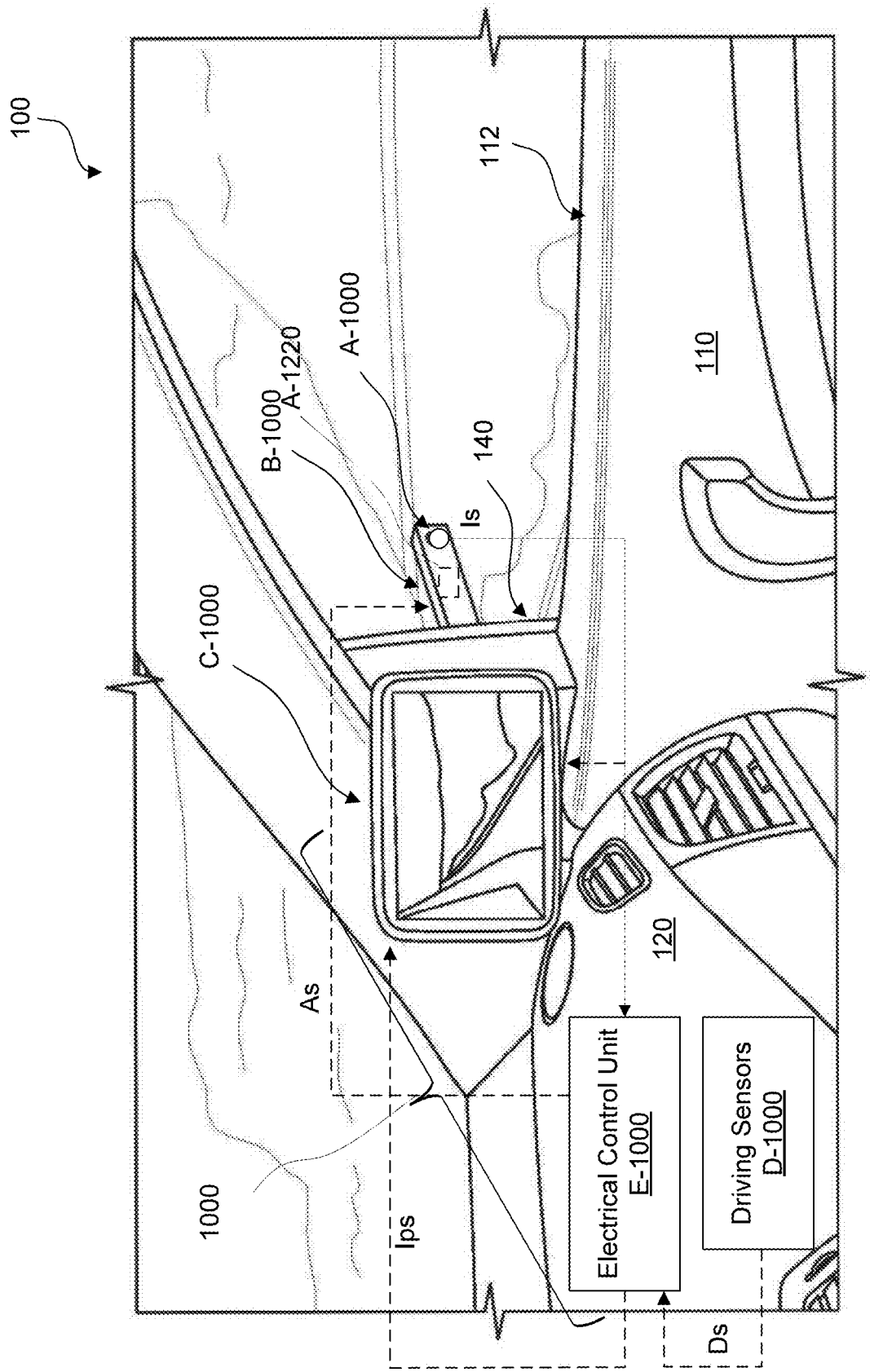
FIG. 1A is an internal perspective view of a lateral view system in a deployed position, according to certain aspects of the disclosure.

All publications, patent applications, patents, and other references mentioned herein are incorporated by reference in their entirety. Further, the materials, methods, and examples discussed herein are illustrative only and are not intended to be limiting.

In the drawings, like reference numerals designate identical or corresponding parts throughout the several views. Further, as used herein, the words "a", "an", and the like include a meaning of "one or more", unless stated otherwise. The drawings are generally drawn not to scale unless specified otherwise or illustrating schematic structures or flowcharts.

Figure 1B:
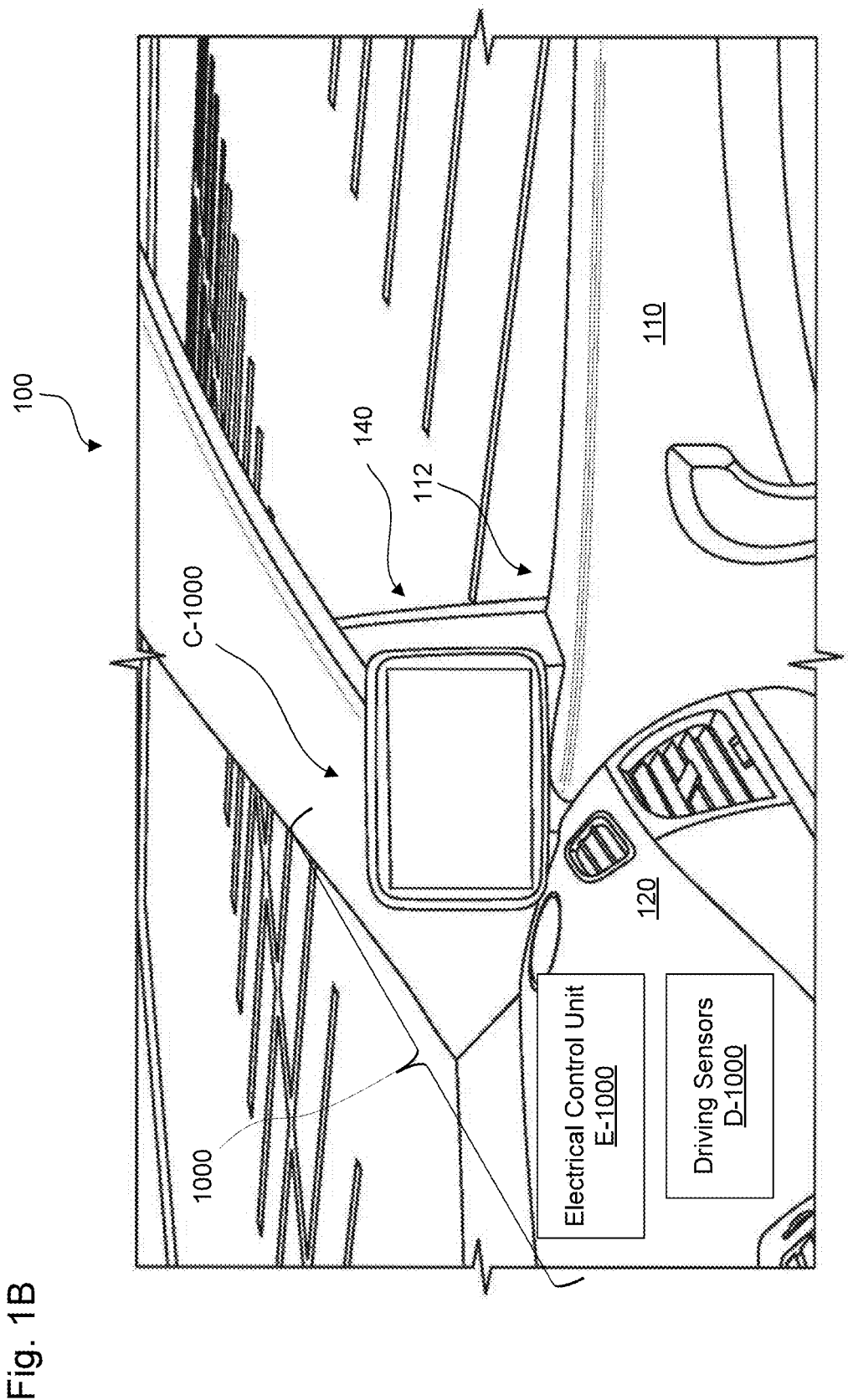
FIG. 1B is an internal perspective view of the lateral view system in a concealed position, according to certain aspects of the disclosure.

FIGS. 1A-1B are internal perspective views of a lateral view system 1000 in a deployed position and in a concealed position, according to certain aspects of the disclosure.

Figure 2A:
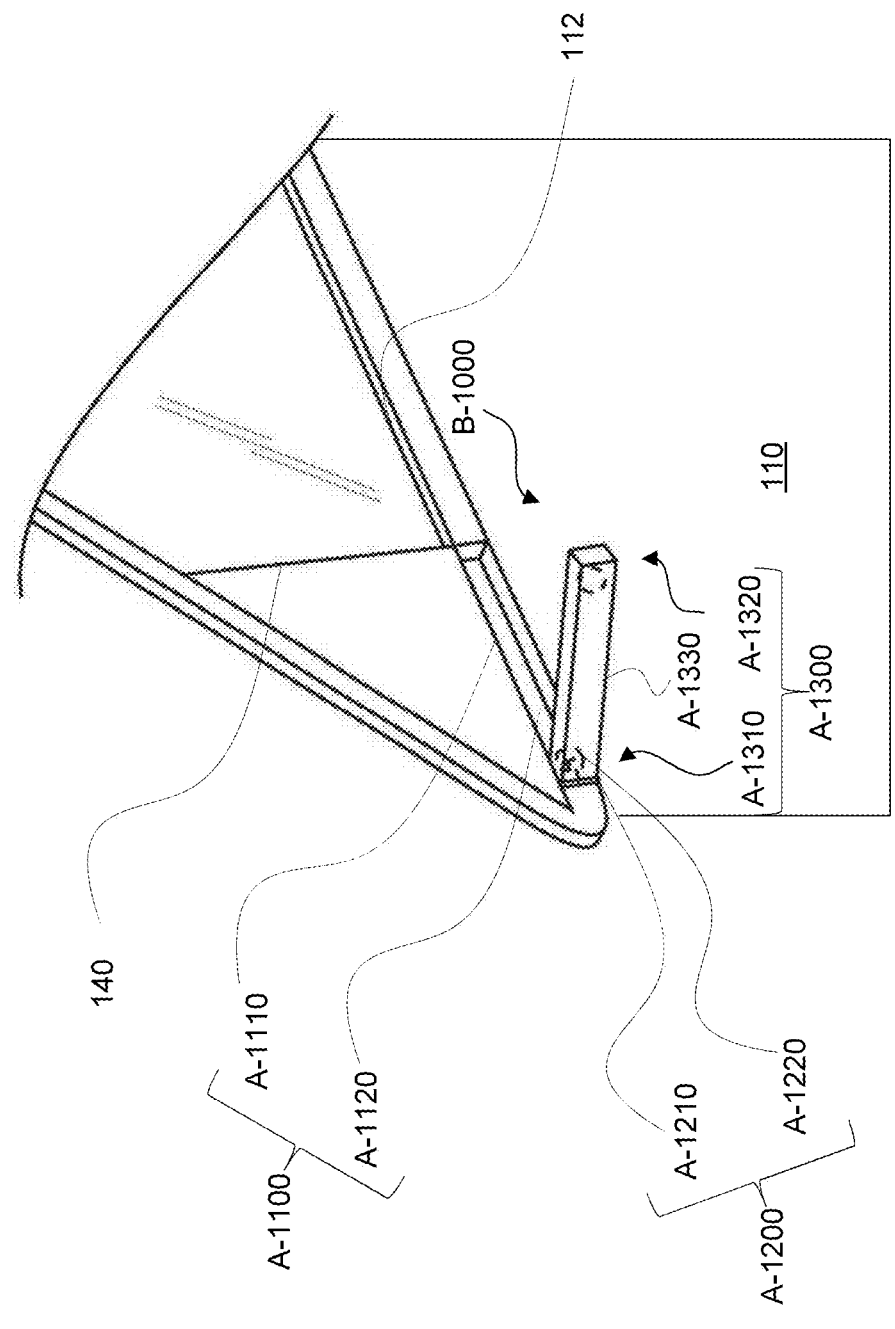
FIG. 2A is an external perspective view of the lateral view system in a first configuration and in the deployed position, according to certain aspects of the disclosure.
Figure 2B:
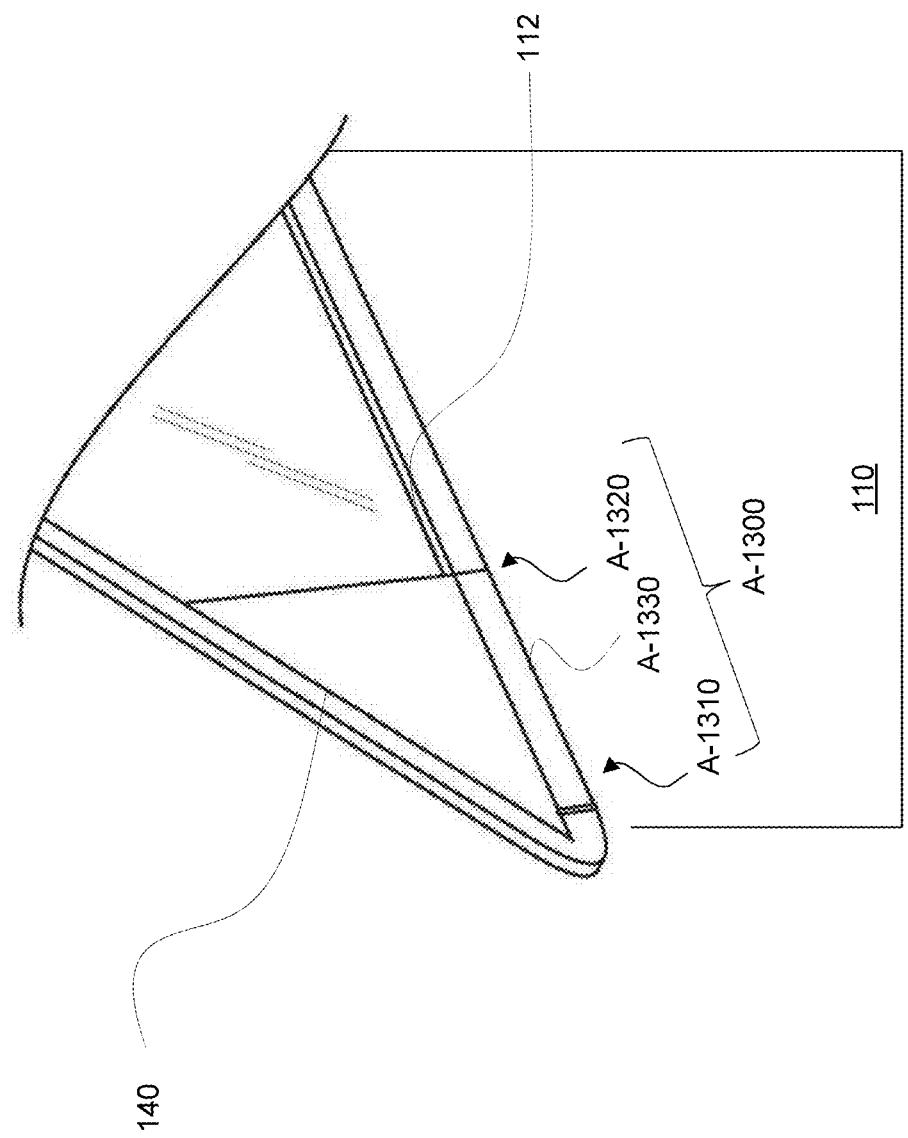
FIG. 2B is an external perspective view of the lateral view system in the first configuration and in the concealed position, according to certain aspects of the disclosure.
Figure 3A:
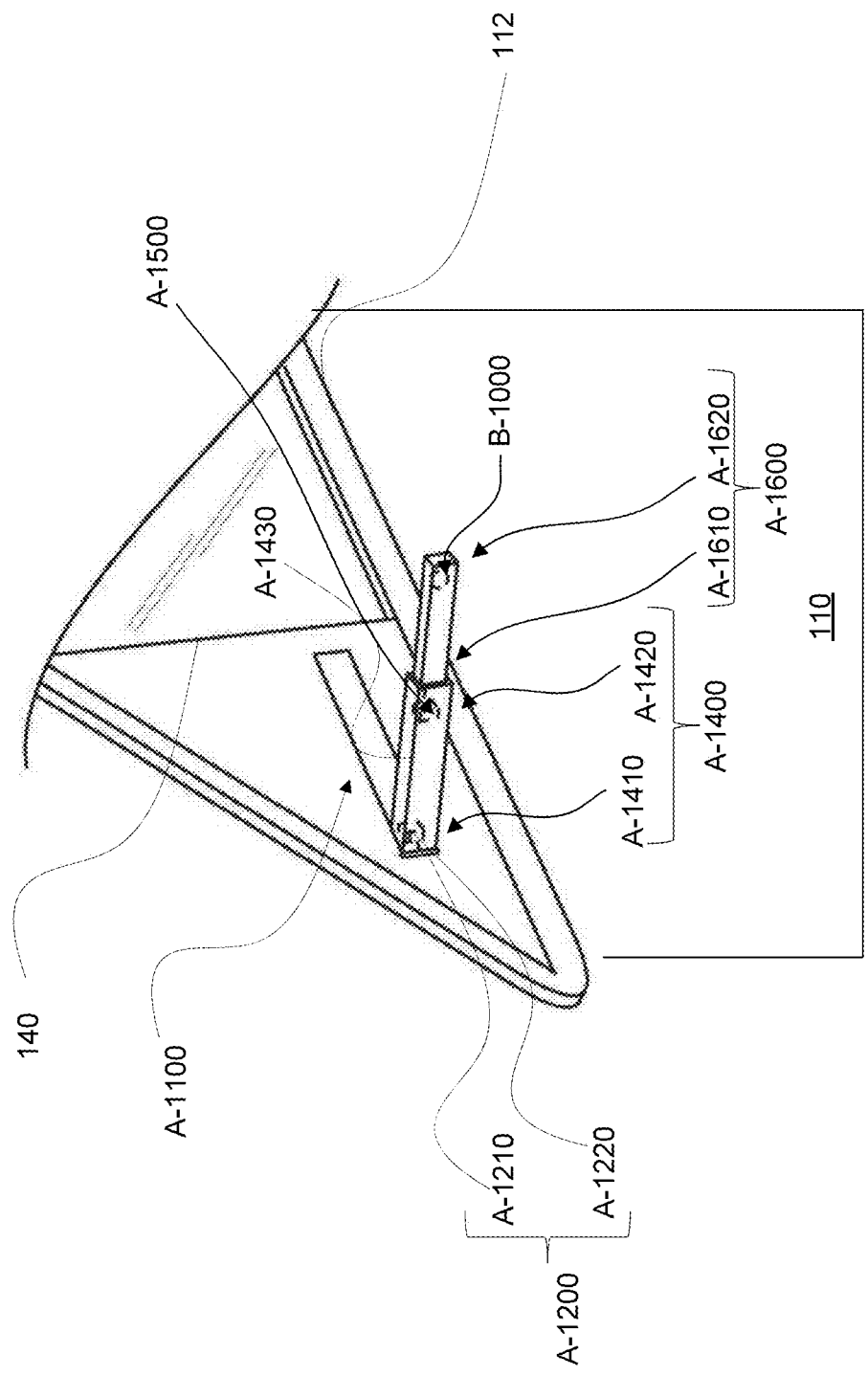
FIG. 3A is an external perspective view of the lateral view system in a second configuration and in the deployed position, according to certain aspects of the disclosure.
Figure 3B:
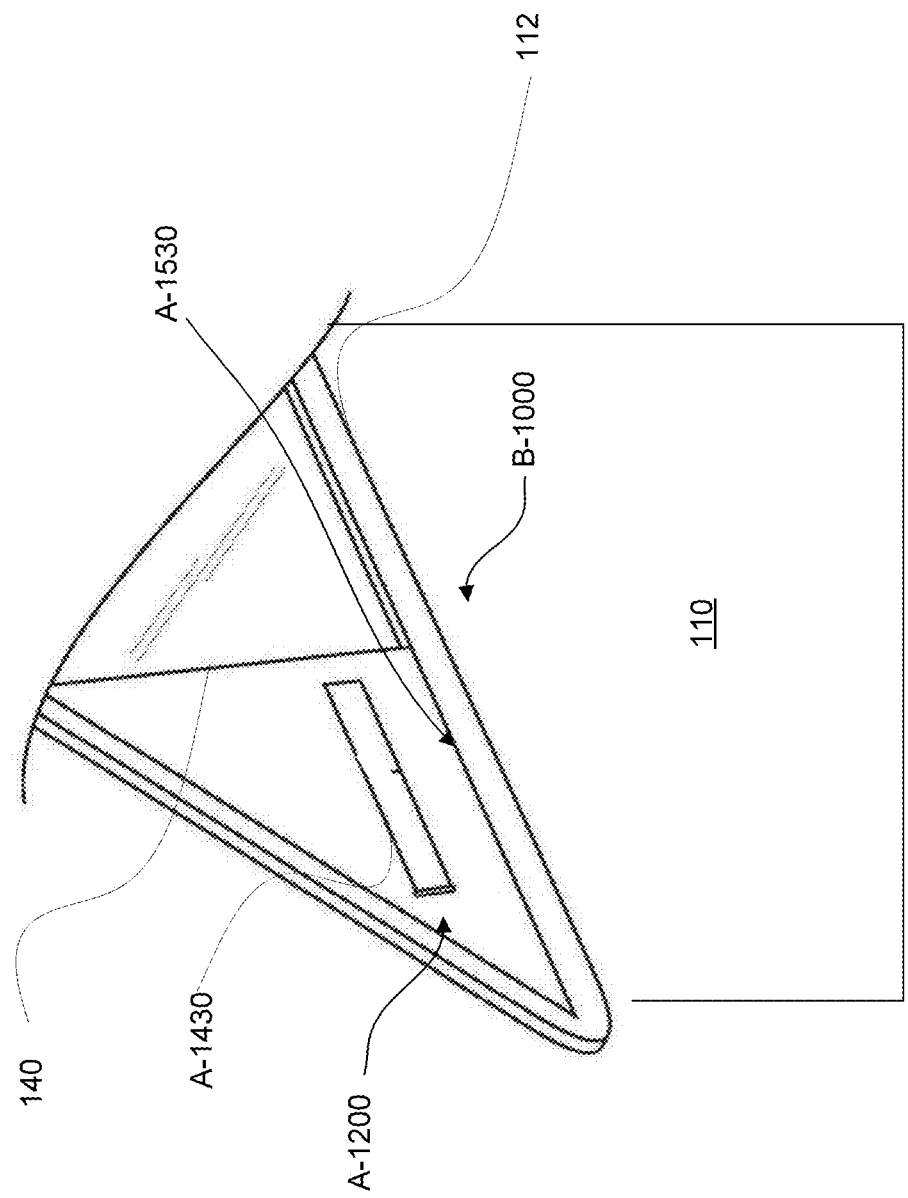
FIG. 3B is an external perspective view of the lateral view system in the second configuration and in the concealed position, according to certain aspects of the disclosure.

The lateral view system 1000 for a vehicle 100 presented is articulable between a deployed position, as displayed in FIGS. 1A, 2A and 3A, and in a concealed position, as displayed in FIGS. 1B, 2B, and 3B.

In the deployed position the lateral view system 1000 can provide to a driver a lateral view of the vehicle 100 to enhance field of view of the driver, e.g. eliminate blind spots and/or other region outside the peripheral field of view of the driver.

In the concealed position the lateral view system 1000 provides concealment in a door 110 of the vehicle 100, e.g. the lateral view system 1000 is substantially unnoticeable and provides a substantially continuous and flush surface with the door 110.

The lateral view system 1000 can include a camera A-1000, an articulable arm B-1000 extending between the door 110 of the vehicle 100 and the camera A-1000, a display device C-1000 positioned on an internal surface 120 of the vehicle 100, a plurality of driving sensors D-1000, and an electrical control unit E-1000 electrically linked to the camera A-1000, the articulable arm B-1000, the display device C-1000, and the plurality of driving sensors D-1000.

In an embodiment, the lateral view system 1000 includes one or more indicators positioned on the articulable arm B-1000. The one or more indicators can be configured, via the electrical control unit E-1000, to communicate vehicle 100 relevant information to the driver, to a driver of a trailing vehicle, to a driver of a leading vehicle, or to a driver of an otherwise adjacent vehicle. In an example, the one or more indicators are turn signals. In another embodiment, the one or more indicators include a light configured, via the electrical control unit E-1000, to illuminate a field of view of the camera A-1000.

The camera A-1000 can be any type of video camera configured to capture time series images of a lateral field of view of the vehicle 100 and provide image signals Is corresponding to the time series images to the electrical control unit E-1000. For example, the camera A-1000 can be a video camera equipped with wide-angle or fisheye lens.

The display device C-1000 can be any type of monitor configured to receive the image signals Is from the camera A-1000 and display to the lateral field of view of the vehicle 100 to the driver and allow the driver to be aware of his or her surrounding, e.g. vehicle passing over, or the like. For example, the display device C-1000 can be a liquid crystal display monitor, a organic light-emitting diode monitor, or the like.

To facilitate viewing from the driver, the display device C-1000 can be mounted on an internal surface 120 of the vehicle 100, e.g. dashboard and/or near junction between dashboard and the door 110 of the vehicle 100.

In an embodiment, the display device C-1000 can be operatively coupled to the electrical control unit E-1000 to process the image signals Is from the camera A-1000 via software instructions executed by the electrical control unit E-1000. For example, the image signals Is can be processed by the electrical control unit E-1000 to remove noise, add scaling marks, provide information, and/or alert signals, or the like. In another embodiment, as related to an autonomous vehicle, image signals Is can be processed by the electrical control unit E-1000 in order to inform a vehicle control unit of environmental conditions pertinent to vehicle operation. In an example, the electrical control unit E-1000, upon processing the image signals Is from the camera A-1000, can inform the vehicle control unit of the autonomous vehicle of the presence of a vehicle in an adjacent lane, information that can be relevant when a driving action, such as a lane change, is being considered. Similarly, the vehicle control unit can be informed, via the electrical control unit E-1000, of environmental information processed from data obtained from the plurality of driving sensors D-1000.

The plurality of driving sensors D-1000 can be any type of sensors configured to provide driving signals Ds commensurate with driving conditions and/or mode of the vehicle 100, e.g. parked, moving forward, moving backward, speed of the vehicle 100, or the like, to the electrical control unit E-1000. For example, the plurality of driving sensors D-1000 can include speedometers, accelerometers, parking brake engagement detector, or the like.

The articulable arm B-1000 can extend between the door 110 of the vehicle 100 and the camera A-1000 and provide articulation of the lateral view system 1000 between the deployed position and the concealed position.

In the deployed position the camera A-1000 is oriented to provide lateral field of view of the vehicle 100 and allow the driver to be aware of his or her surrounding, while in the concealed position the lateral view system 1000 is concealed in the door 110 of the vehicle 100.

FIGS. 2A-2B are external perspective views of the lateral view system 1000 in a first configuration, in the deployed position and the concealed position, according to certain aspects of the disclosure.

The articulable arm B-1000 can include an arm housing A-1100, a hinge assembly A-1200 affixed to the arm housing A-1100, a first arm terminal portion A-1310 rotatably affixed to the arm housing A-1100 via the hinge assembly A-1200, a second arm terminal portion A-1320 affixed to the camera A-1000, and an arm member A-1300 extending between the first arm terminal portion A-1310 and the second arm terminal portion A-1320.

The arm housing A-1100 can be embedded in a belt mold 112 of the door 110 and configured to receive the arm member A-1300 and the camera A-1000 when the lateral view system 1000 is in the concealed position. For example, the arm housing A-1100 can have a shape that matches a shape of the arm member A-1300 and/or have dimensions, e.g. length, width, and/or depth, that matches dimensions of the arm member A-1300 and/or the belt mold 112 of the door 110 of the vehicle 100, e.g. length, width, and/or depth.

The arm housing A-1100 can include a housing opening A-1110 flush with the belt mold 112 and a housing shell A-1120 embedded into the door 110 along a lateral portion of the belt mold 112.

The arm member A-1300 can include an arm member external surface A-1330 that is flush with the belt mold 112 and aligned with the belt mold 112 and have substantially similar esthetical appearance than the belt mold 112, e.g. substantially the same color, same coating, same shape, same profile, and/or be made with similar materials.

The hinge assembly A-1200 can include a hinge pivot A-1210 and a hinge actuator A-1220 coupled to the hinge pivot A-1210.

The hinge pivot A-1210 can be any type of mechanical bearing that provides concealment and rotation of the arm member A-1300. For example, the hinge pivot A-1210 can be a bearing, spring hinge, mortise hinge, concealment hinge, piano hinge, barrel hinge, or the like.

The hinge actuator A-1220 can be any type of actuator configured to receive from the electrical control unit E-1000 actuation articulation signals As commensurate with an articulation of the lateral view system 1000 and operate the hinge pivot A-1210 to articulate the lateral view system 1000 between the deployed position and the concealed position via rotating motion. For example, the hinge actuator A-1220 can be an electrical motor, a solenoid, a piezoelectric system, a pneumatic system, a stepper motor, a servo mechanism, or the like.

In an embodiment, operation of the hinge pivot A-1210 to articulate the lateral view system 1000 between the deployed position and the concealed position via rotating motion can be initiated by a user command. The user command can be a vocal command received as audio by the electrical control unit E-1000, a tactile command received via a tactile user interface, or the like. According to the user command received, the electrical control unit E-1000 can transmit actuation articular signals As to control the status of the lateral view system 1000 via actuation of the hinge pivot A-1210.

In another embodiment, operation of the hinge pivot A-1210 to articulate the lateral view system 1000 between the deployed position and the concealed position via rotating motion can be initiated responsive to processed data obtained by one of the plurality of driving sensors. In an example, data obtained by the plurality of driving sensors is processed by the electrical control unit E-1000 and determined to indicate a close proximity of an adjacent vehicle during a driving operation such as a parking operation. In such an example, and in order to protect the lateral view system 1000 from damage caused by collision with the adjacent vehicle, the hinge pivot A-1210 can be actuated such that the lateral view system 1000 is moved to a concealed position.

FIGS. 3A-3B are external perspective views of the lateral view system 1000 in a second configuration, in the deployed position and the concealed position, according to certain aspects of the disclosure.

In addition and/or alternatively to the first configuration, the lateral view system 1000 can be in a second configuration wherein the arm member A-1300 is telescoping to be extended and retracted when the lateral view system 1000 is articulated between the concealed position and deployed position.

The arm member A-1300 can include an outer arm member A-1400 and an inner arm member A-1600 slidably inserted in the outer arm member A-1400.

The outer arm member A-1400 can include a first outer terminal portion A-1410 affixed to the hinge assembly A-1200 and a second outer terminal portion A-1420 that receives the inner arm member A-1600.

In addition, the arm member A-1300 can include can include an outer arm member external surface A-1430 that is flush with the sail 140 and have substantially similar esthetical appearance than the sail 140, e.g. substantially the same color, same coating, same shape, same profile, and/or be made with similar materials.

The inner arm member A-1600 can include a first inner terminal portion A-1610 inserted in the second outer terminal portion A-1420 and a second inner terminal portion A-1620 affixed to the camera A-1000.

In addition, the lateral view system 1000 can include a telescopic actuator A-1500 to expand and contract the arm member A-1300.

The telescopic actuator A-1500 can be any type of actuator configured to receive from the electrical control unit E-1000 the actuation articulation signals As commensurate with an articulation of the lateral view system 1000 and slide the inner arm member A-1600 into the outer arm member A-1400 to articulate the lateral view system 1000 between the deployed position and the concealed position. For example, the telescopic actuator A-1500 can be an electrical motor, a solenoid, a piezoelectric system, a pneumatic system, a stepper motor, a servo mechanism, or the like.

Figure 4:
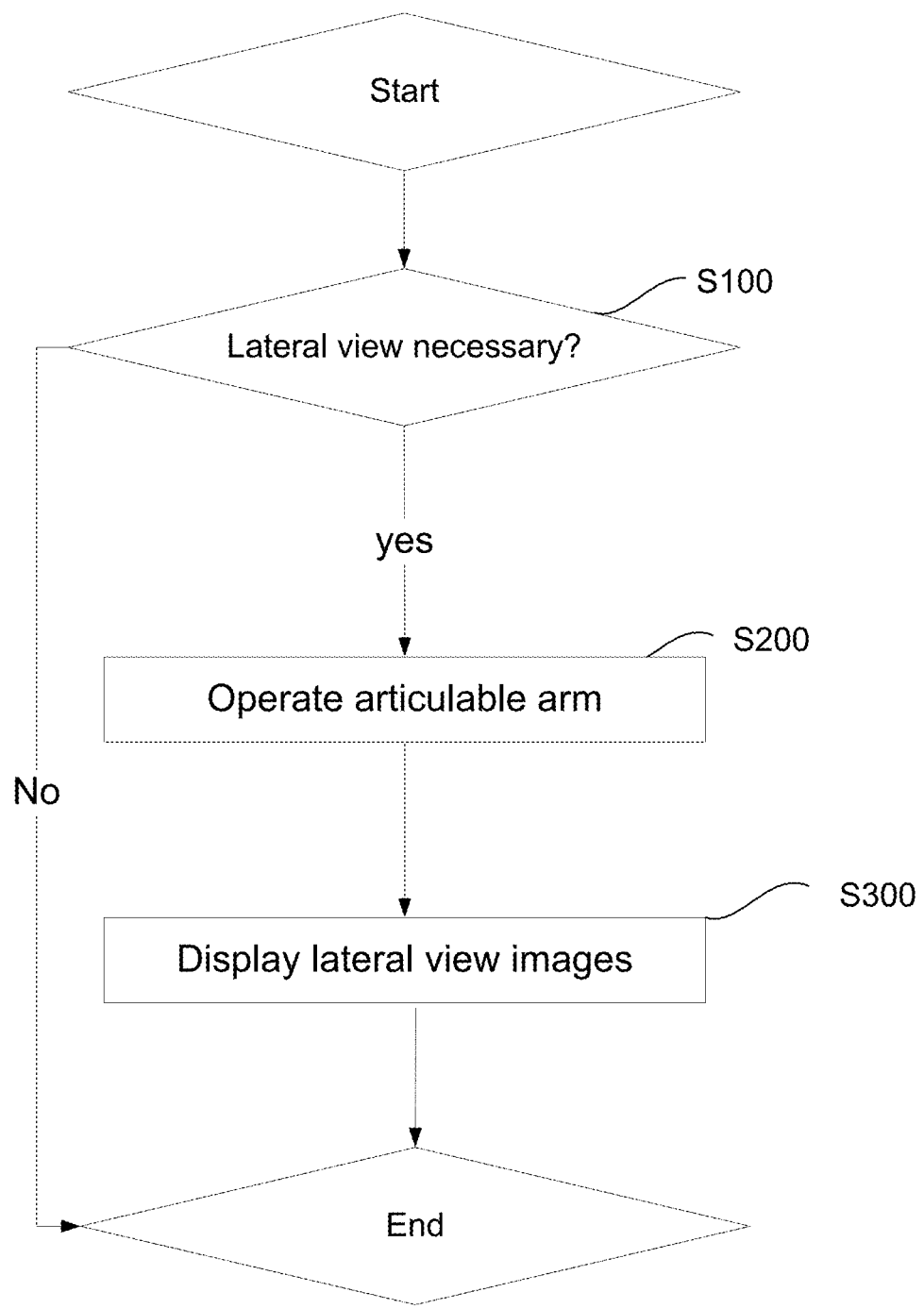
FIG. 4 is a flowchart of a method for operating the lateral view system, according to certain aspects of the disclosure.

FIG. 4 is a flowchart of a method for operating the lateral view system 1000, according to certain aspects of the disclosure.

In a step S100, it is determined if a lateral view of the vehicle 100 is necessary through the plurality of driving sensors D-1000 and software instructions executed by the electrical control unit E-1000.

For example, the electrical control unit E-1000 can be configured to receive the driving signals Ds from the plurality of driving sensors D-1000 and software instructions can be written to extract a displacement speed of the vehicle 100, and compare the extracted displacement speed a predetermined threshold speed, e.g. between 0.10 km/h and 10.00 km/h, and preferably 1.00 km/h and 5.00 km/h. If the extracted displacement speed is above the predetermined threshold speed it is determined that lateral view of the vehicle is needed. Otherwise, the process stops.

In another example, the electrical control unit E-1000 can be configured to receive the driving signals Ds from the plurality of driving sensors D-1000 and software instructions can be written to a drive gear selection of the vehicle 100. If the drive gear selection is detected, it is determined that lateral view of the vehicle is needed. Otherwise, the process stops.

In another example, the electrical control unit E-1000 can be configured to receive demand input from the driver, via push buttons, graphical user interfaces, or the like, commensurate with a need to have a lateral view of the vehicle 100. If the demand input from the driver are received, it is determined that lateral view of the vehicle is needed. Otherwise, the process stops.

In the step S200, the articulable arm B-1000 is articulated from the concealed position to the extended position through the hinge actuator A-1220 and/or the telescopic actuator A-1500 and software instructions executed by the electrical control unit E-1000.

For example, the electrical control unit E-1000 can be configured to provide the actuation articulation signals As to the hinge actuator A-1220 and/or the telescopic actuator A-1500 and articulate the articulable arm B-1000 from the concealed position to the extended position.

In the step S300, the lateral view of the vehicle 100 is displayed to the driver through the camera A-1000 and the display device C-1000 and software instructions executed by the electrical control unit E-1000.

For example, the electrical control unit E-1000 can be configured to receive the image signals Is from the camera A-1000 and provide processed image signals Ips commensurate with time series images that have been filtered and/or enhance to the display device C-1000. Software instruction can be written to remove noise from the image signals Is, add scaling and/or positioning marks, e.g. outline of the vehicle 100, to the image signals Is, provide information, and/or alert signals, e.g. indication of vehicle presence in the field of view of the camera A-1000.

The different elements of the electrical control unit C-1000 as well as their interactions and functionality will be described in further details in the following paragraphs.

Figure 5:
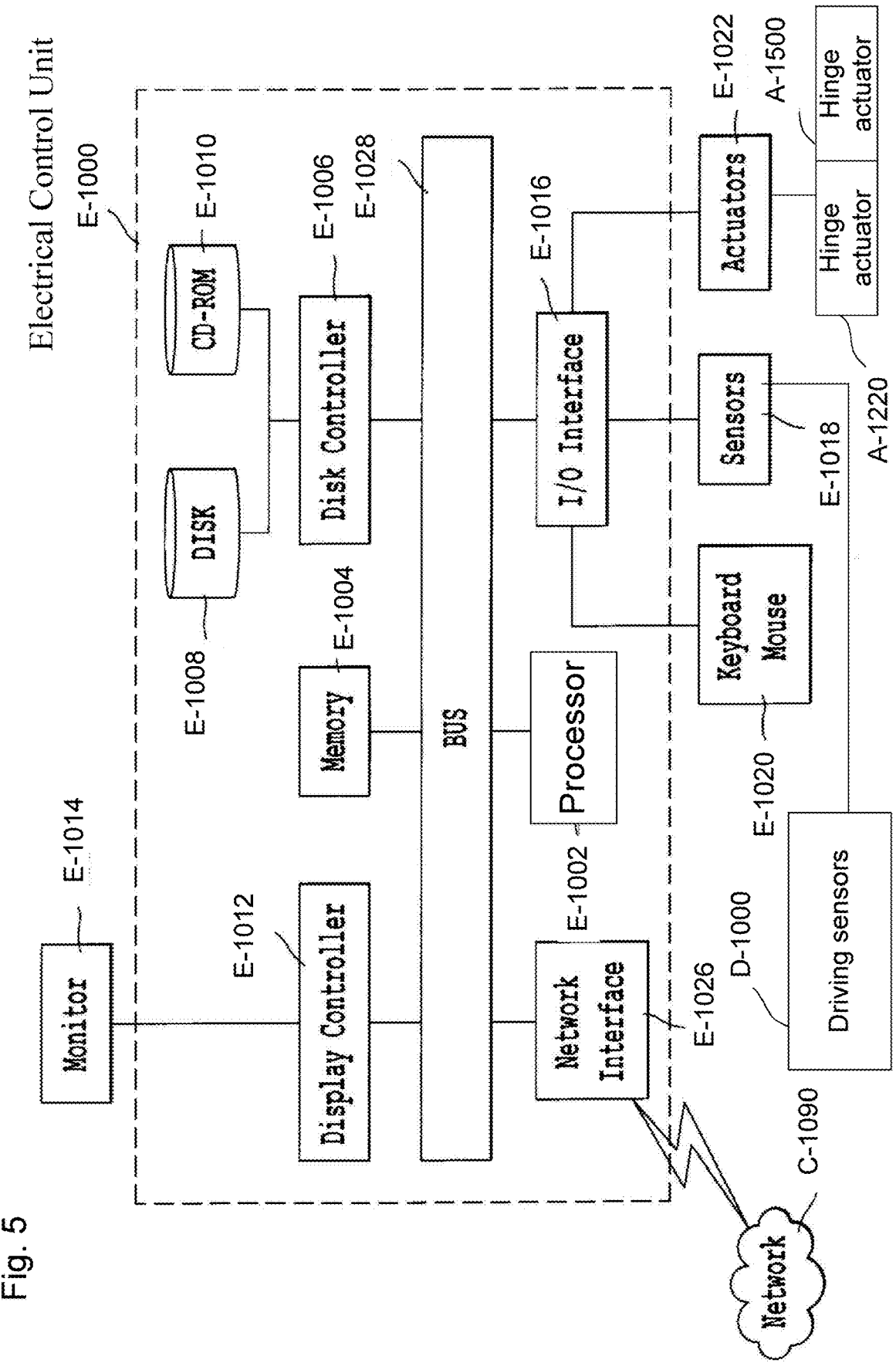
FIG. 5 is a schematic view of a hardware diagram of an electrical control unit for operating the lateral view system, according to certain aspects of the disclosure.

FIG. 5 depicts the electrical control unit E-1000 to control the apparatus to draft a patent application. As shown in FIG. 5, systems, operations, and processes in accordance with this disclosure may be implemented using a processor E-1002 or at least one application specific processor (ASP). The processor E-1002 may utilize a computer readable storage medium, such as a memory E-1004 (e.g., ROM, EPROM, EEPROM, flash memory, static memory, DRAM, SDRAM, and their equivalents), configured to control the processor E-1002 to perform and/or control the systems, operations, and processes of this disclosure. Other storage mediums may be controlled via a disk controller E-1006, which may control a hard disk drive E-1008 or optical disk drive E-1010.

The processor E-1002 or aspects thereof, in an alternate embodiment, can include or exclusively include a logic device for augmenting or fully implementing this disclosure. Such a logic device includes, but is not limited to, an application-specific integrated circuit (ASIC), a field programmable gate array (FPGA), a generic-array of logic (GAL), and their equivalents. The processor E-1002 may be a separate device or a single processing mechanism. Further, this disclosure may benefit form parallel processing capabilities of a multi-cored processor.

In another aspect, results of processing in accordance with this disclosure may be displayed via a display controller E-1012 to a monitor E-1014 that may be peripheral to or part of the electrical control unit E-1000. Moreover, the monitor E-1014 may be provided with a touch-sensitive interface to a command/instruction interface. The display controller E-1012 may also include at least one graphic processing unit for improved computational efficiency. Additionally, the electrical control unit E-1000 may include an I/O (input/output) interface E-1016, provided for inputting sensor data from sensors E-1018 and for outputting orders to actuators E-1022. The sensors E-1018 and actuators E-1022 are illustrative of any of the sensors and actuators described in this disclosure. For example, the sensors E-1018 can include the plurality of driving sensors D-100, while the actuators E-1022 can include the hinge actuator A-1220 and the telescopic actuator A-1500.

Further, other input devices may be connected to an I/O interface E-1016 as peripherals or as part of the controller E-1000. For example, a keyboard or a pointing device such as a mouse E-1020 may control parameters of the various processes and algorithms of this disclosure, and may be connected to the I/O interface E-1016 to provide additional functionality and configuration options, or to control display characteristics. Actuators E-1022 which may be embodied in any of the elements of the apparatuses described in this disclosure may also be connected to the I/O interface E-1016.

The above-noted hardware components may be coupled to the network E-1024, such as the Internet or a local intranet, via a network interface E-1026 for the transmission or reception of data, including controllable parameters to a mobile device. A central BUS E-1028 may be provided to connect the above-noted hardware components together, and to provide at least one path for digital communication there between.

The foregoing discussion discloses and describes merely exemplary embodiments of an object of the present disclosure. As will be understood by those skilled in the art, an object of the present disclosure may be embodied in other specific forms without departing from the spirit or essential characteristics thereof. Accordingly, the present disclosure is intended to be illustrative, but not limiting of the scope of an object of the present disclosure as well as the claims.

Numerous modifications and variations on the present disclosure are possible in light of the above teachings. It is therefore to be understood that within the scope of the appended claims, the disclosure may be practiced otherwise than as specifically described herein.

The invention claimed is:

1. A lateral view system for a vehicle, comprising:
a display configured to display a lateral view of the vehicle;
a camera, operatively coupled to the display, that captures the lateral view of the vehicle; and
an arm configured to articulate between a concealed position in a housing in a door portion of the vehicle and a deployed position partially external to the housing in the door portion of the vehicle, the arm having a first end articulably affixed to the door portion of the vehicle and a second end affixed to the camera, wherein the camera is concealed when the arm is in the concealed position, and
a contour of an external surface of the arm matches an adjacent contour of an external surface of the door portion, the external surface of the arm being flush with the external surface of the door portion when the arm is in the concealed position.

2. The lateral view system of claim 1, wherein the door portion of the vehicle is located along a door belt mold of the vehicle.

3. The lateral view system of claim 1, wherein the door portion of the vehicle is located on a door sail of the vehicle.

4. The lateral view system of claim 1, wherein the first end of the arm is hingedly-affixed to the door portion of the vehicle.

5. The lateral view system of claim 4, wherein the arm is actuated by a hinge actuator, the hinge actuator articulating the arm between the deployed position and the concealed position.

6. The lateral view system of claim 1, wherein the arm includes an outer sleeve and an inner core, the camera being affixed to the inner core and slidable within the outer sleeve in order move the camera between a concealed position and a visible position.

7. The lateral view system of claim 6, wherein a linear actuator is configured to telescopically slide the inner core within the outer sleeve.

8. The lateral view system of claim 1, wherein the external surface of the arm and the external surface of the door portion are coated with a same material.

9. A lateral view system for a vehicle, comprising:
a display configured to display a lateral view of the vehicle;
a camera operatively coupled to the display and configured to capture the lateral view of the vehicle;
an arm configured to articulate between a concealed position in a housing in a door portion of the vehicle and a deployed position partially external to the housing in the door portion of the vehicle, the arm having a first end articulably affixed to the door portion of the vehicle and a second end affixed to the camera, wherein a contour of an external surface of the arm matches an adjacent contour of an external surface of the door portion, the external surface of the arm being flush with the external surface of the door portion when the arm is in the concealed position;
one or more actuators that affix the first end of the arm to the door portion;
a plurality of sensors configured to provide driving signals commensurate with driving conditions of the vehicle; and
processing circuitry configured to
receive the driving signals,
detect a need of the lateral view of the vehicle based on the received driving signals, and send actuation signals to the one or more actuators to articulate the arm from the concealed position.

10. The lateral view system of claim 9, wherein the door portion of the vehicle is located along a door belt mold of the vehicle.

11. The lateral view system of claim 9, wherein the door portion of the vehicle is located on a door sail of the vehicle.

12. The lateral view system of claim 9, wherein the first end of the arm is hingedly-affixed to the door portion of the vehicle.

13. The lateral view system of claim 12, wherein the one or more actuators include a hinge actuator configured to articulate the arm between the deployed position and the concealed position.

14. The lateral view system of claim 9, wherein the arm includes an outer sleeve and an inner core, the camera being affixed to the inner core and slidable within the outer sleeve in order to move the camera between a concealed position and a visible position.

15. The lateral view system of claim 14, wherein the one or more actuators include a linear actuator configured to telescopically slide the inner core within in the outer sleeve.

16. The lateral view system of claim 9, wherein the external surface of the arm and the external surface of the door portion are coated with a same material.

17. The lateral view system of claim 9, wherein the plurality of sensors includes a speed sensor to provide speed signals commensurate with a speed of the vehicle.

18. The lateral view system of claim 17, wherein the processing circuitry is further configured to
receive the speed signals,
extract a speed of the vehicle from the received speed signals, and
compare the extracted speed of the vehicle to a speed threshold.

19. A method for providing a lateral view of a vehicle to a driver, comprising:
acquiring driving signals, from a plurality of driving sensors, commensurate with driving conditions of the vehicle;
detecting a need for the lateral view of the vehicle;
actuating an arm from a concealed position in a housing in a door portion of the vehicle to a deployed position partially external to the housing in the door portion of the vehicle;
acquiring image signals commensurate with the lateral view of the vehicle from a camera affixed to the arm; and
displaying, by processing circuitry, the lateral view of the vehicle on a display arranged on an internal surface of the vehicle,
wherein a contour of an external surface of the arm matches an adjacent contour of an external surface of the door portion, the external surface of the arm being flush with the external surface of the door portion when the arm is in the concealed position.

20. The lateral view system of claim 1, wherein the camera is concealed upon articulation of the arm to the concealed position.

* * * * *